July 24, 1951 W. Y. LANG 2,561,476

MAGNETIC RECORDER

Filed Sept. 29, 1947

INVENTOR
W. Y. LANG

BY R. Marino

ATTORNEY

Patented July 24, 1951 2,561,476

UNITED STATES PATENT OFFICE 2,561,476

MAGNETIC RECORDER

Wilmarth Y. Lang, Towaco, N. J., assignor to Bell Telephone Laboratories, Incorporated, New York, N. Y., a corporation of New York Application September 29, 1947, Serial No. 776,671

2 Claims. (Cl. 346—74)

This invention relates to magnetic recorders.

Magnetic recorders have been used heretofore principally for the recording of sounds, such as voice or music, but magnetic recording can also be adapted to the recording of information of any kind. Magnetized spots may be produced on a magnetic wire, tape, disc, or card which vary in position, size, intensity, and polarity and these spots may be arranged in various ways to form codes which represent any kind of information. A large amount of data may be thus recorded on a very small bulk of magnetic medium. Such a record is quite permanent and may be reproduced by well-known means at any time and an indefinite number of times. Furthermore, when it has served its purpose, the record is readily erased and the magnetic medium reused for another record of a similar or of a different kind. The only important disadvantage of magnetic records of this kind is that magnetic recording leaves no visible indication that a record has been recorded nor of the character of the recorded information.

The present invention discloses a convenient method and a simple, durable, and inexpensive means for producing magnetic records in code which may also comprise visible records.

The features of the invention and its mode of operation will be more clearly understood from the accompanying description, the appended claims, and the drawings, in which:

Figure 1:
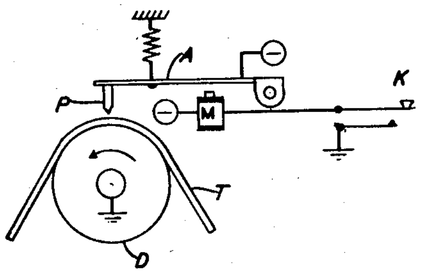
Fig. 1 shows a simple form of magnetic recorder embodying the invention.

In Fig. 1, the magnetic tape T is carried by a rotating drum D which drives said tape by friction, or by a sprocket (not shown) engaging openings in the tape, or by other suitable means. When the key K is depressed, a circuit is completed from battery through the winding of magnet M and contacts of key K to ground, energizing said magnet which, attracting its armature A, presses the magnetized pin P fixed in said armature against the tape T. A magnetized spot is thereby produced on tape T where contacted by pin P. By depressing key K at intervals, a series of such magnetized spots is produced on tape T, the spacing of which on said tape is in accordance with the time-spacing of the operations of key K relative to the speed of tape T. By suitable manipulation of key K, the magnetized spots may be spaced in accordance with an arbitrary code representing the data to be recorded.

The length of each magnetized spot on tape T is in accordance with the length of time key K is depressed in producing said spot. By suitable manipulation of key K, spots of various length may thus be produced to form codes in accordance with the lengths of the spots. Or, codes may be formed by combinations of the lengths and spacing of the spots.

If the speed at which tape T is driven is varied while key K is depressed for equal lengths of time, magnetized spots of various lengths will be produced on tape T. It is also obvious that a magnetized spot will be produced on tape T if key K is depressed while said tape is stationary. By depressing key K with tape T stationary and moving said tape by any suitable means between depressions of said key, such spots may be formed into codes in accordance with their spacing. Or, any combination of the above methods may be used to form the codes. Instead of moving the tape T, said tape may remain stationary and pin P be displaced between depressions of key K by obvious suitable means.

The tape T may be of a type which is visibly affected by the passage of electric current. For example, the magnetic material may be overlaid with a thin layer of white paper. When a suitable potential difference is produced between the surface of said paper and the magnetic material, an electric spark will penetrate the paper, burning a hole through which the contrasting color of the magnetic material is visible. Or the tape may be coated with a compound containing iodine which is discolored by the passage of an electric current through it. Compounds of this kind are well known. Then with a battery of suitable potential connected to armature A and ground connected to drum D, as shown, when pin P contacts said tape, current will flow from battery through armature A, pin P, the tape T, and drum D to ground. The tape T will be discolored by said current, producing visible indications at the points where pin P contacts said tape and, therefore, of the magnetic record on said tape.

Key K may be operated by hand or by any suitable means. Pin P is preferably made of material of high magnetic retentivity, such as material manufactured according to Kelsall et al. Patent 2,190,667 dated February 20, 1940 or Nesbitt Patent 2,298,225 dated October 6, 1942. A disc, card, or other form of magnetic medium may be substituted for tape T.

Other arrangements of a magnetic recorder employing the general method of recording described above will be apparent to one skilled in the art, such as a plurality of magnetized pins operated in combinations to contact the tape in individual paths, etc.

Records produced in any of the ways described above are capable of being used for reproducing the recorded information by the usual and well-known forms of magnetic reproducers.

Figure 2:
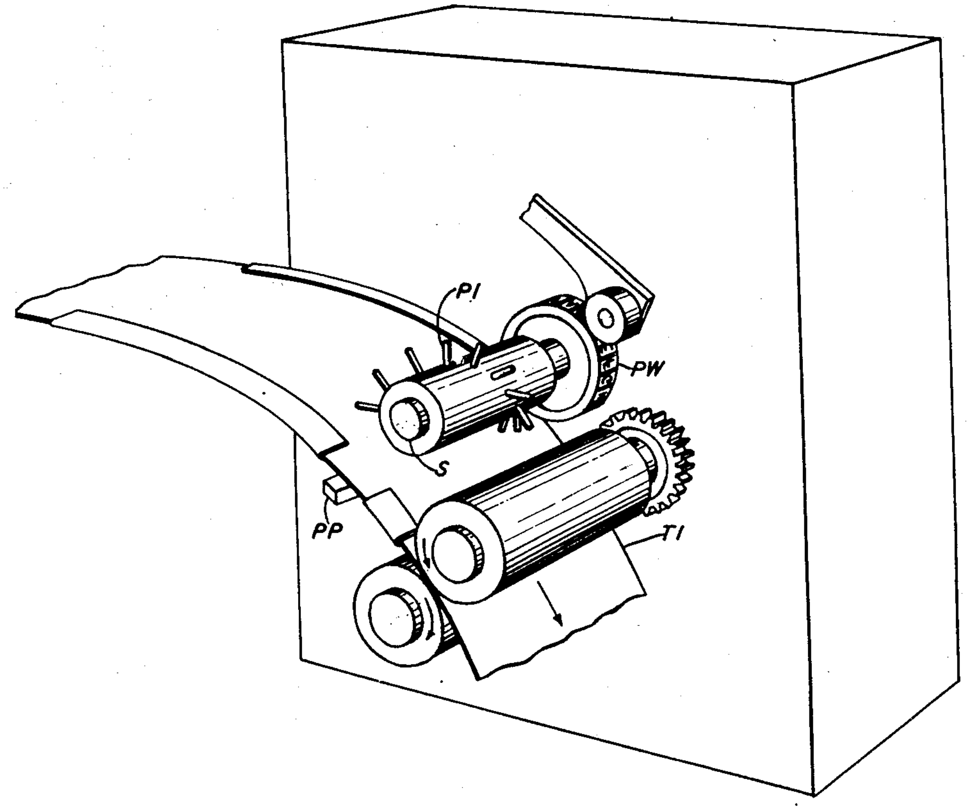
Fig. 2 shows a tape printer arranged for magnetic recording, illustrating one of the many uses to which my invention may be put.

Fig. 2 shows a well-known type of tape printer modified to embody the present invention. A wide tape T1 is provided in place of the narrow tape ordinarily used and said tape or a portion thereof is of magnetic material or coated with magnetic material. The shaft S of the printer wheel is extended across said tape and magnetized pins P1 are helically fixed thereon. Each of said pins is aligned with one of the characters on the printer wheel PW.

When the printer wheel PW is rotated in the well-known manner to bring one of the characters on said printing wheel adjacent to tape T1, the corresponding magnetized pin will also be adjacent to said tape. Then when the pressure plate PP rises to cause said character to be printed on said tape, said pin contacts tape T1 at the magnetizable portion thereof, producing thereon a magnetized spot. The position of said spot transversely across said tape is indicative of the character printed. Each character printed is, therefore, accompanied by a magnetized spot whose position across the tape indicates said character. A magnetic record is thus produced which agrees with the printed record. Of course, if desired, the printer wheel PW may be removed so that no printed record is made. The tape T1 may be of the type visibly affected by electric current and battery suitably connected so that current will flow from each pin which contacts said tape through said tape to ground, producing a visible record corresponding to the magnetic record.

What is claimed is:

1. In a magnetic recording device, a rotatable shaft having thereon a printer wheel and a plurality of magnetized pins helically disposed thereabout, each of said pins being in alignment with a character on said printer wheel, a magnetic medium, means for rotating said shaft to bring each of said pins adjacent to said magnetic medium, and means for simultaneously contacting an adjacent pin and the corresponding character on said printer wheel to said magnetic medium.

2. In a magnetic recording device, a rotatable shaft having a printer wheel and a plurality of magnetized pins thereon, said pins being helically disposed about said shaft and each of said pins being in alignment with a character on said printer wheel, a magnetic medium, means for rotating said shaft to bring each of said pins adjacent to said magnetic medium, and means for simultaneously contacting said adjacent pin and said printer wheel to said magnetic medium, thereby to produce on said medium a printing of the character which is impressed by the wheel on said medium and a magnetized spot for said printed character which is indicated by the position of said spot on said medium.

WILMARTH Y. LANG.

REFERENCES CITED

The following references are of record in the file of this patent:

UNITED STATES PATENTS

| Number | Name | Date |
|---|---|---|
| 978,480 | Pearson | Dec. 13, 1910 |
| 1,706,044 | Taylor | Mar. 19, 1929 |
| 1,825,551 | Serrell | Sept. 29, 1931 |
| 1,875,063 | Ludenia | Aug. 30, 1932 |
| 2,080,100 | Tauschek | May 11, 1937 |
| 2,359,617 | Bryce | Oct. 3, 1944 |
| 2,391,912 | Magee | Jan. 1, 1946 |
| 2,416,445 | Jensen | Feb. 25, 1947 |
| 2,427,421 | Rieber | Sept. 16, 1947 |